(12) United States Patent
Lacy et al.

(10) Patent No.: US 10,477,764 B2
(45) Date of Patent: Nov. 19, 2019

(54) CROP HARVESTING MACHINE INCLUDING RETRACTABLE SENSOR FINGERS WITH ADJUSTABLE GROUND PRESSURE AND HEADER TILT CONTROL

(71) Applicant: MacDon Industries Ltd., Winnipeg (CA)

(72) Inventors: Nolan Lacy, Winnipeg (CA); Philip Otto, Winnipeg (CA); Neil Barnett, Winnipeg (CA)

(73) Assignee: MacDon Industries Ltd.

( * ) Notice: Subject to any disclaimer, the term of this patent is extended or adjusted under 35 U.S.C. 154(b) by 76 days.

(21) Appl. No.: 15/471,475

(22) Filed: Mar. 28, 2017

(65) Prior Publication Data

US 2018/0279549 A1 Oct. 4, 2018

(51) Int. Cl.
*A01D 41/14* (2006.01)
*A01D 34/04* (2006.01)

(52) U.S. Cl.
CPC ........... *A01D 41/141* (2013.01); *A01D 34/04* (2013.01); *A01D 41/145* (2013.01)

(58) Field of Classification Search
CPC .... A01D 41/141; A01D 41/145; A01D 41/06; A01D 75/287
See application file for complete search history.

(56) References Cited

U.S. PATENT DOCUMENTS

| | | | | |
|---|---|---|---|---|
| 4,091,602 A | * | 5/1978 | Williams | A01D 34/30 56/14.4 |
| 5,694,751 A | * | 12/1997 | Behnke | A01B 69/008 56/10.2 F |
| 6,516,595 B2 | * | 2/2003 | Rhody | A01B 63/1145 172/4 |
| 2015/0101300 A1 | * | 4/2015 | Pierson | A01D 41/141 56/10.2 E |

* cited by examiner

*Primary Examiner* — Alicia Torres
(74) *Attorney, Agent, or Firm* — Ryan W. Dupuis; Ade & Company Inc.; Kyle R. Satterthwaite

(57) ABSTRACT

A crop harvesting machine with a cutter bar on a header frame has a height control system which uses depending sensor fingers arranged in contact with the ground so as to measure a height of the cutter bar above the ground. The sensor fingers are controllably retractable under actuation from an operator in the cab or automatically in response to prescribed conditions being met. The actuator used in retracting the sensor fingers can also be used to adjustably control ground pressure of the sensor fingers in the deployed position of the sensor fingers engaging the ground. The header height is adjusted using laterally spaced apart hydraulic linkages which can be operated at different elevations relative to one another responsive to different height signals relating height of opposing ends of the header frame relative to the ground to also control tilt of the header relative to the harvester frame.

20 Claims, 6 Drawing Sheets

CROP HARVESTING MACHINE INCLUDING RETRACTABLE SENSOR FINGERS WITH ADJUSTABLE GROUND PRESSURE AND HEADER TILT CONTROL

FIELD OF THE INVENTION

This invention relates to a crop harvesting machine including a tractor and a header with cutter bar that has a height control system which uses depending sensor fingers arranged in contact with the ground so as to measure a height of the cutter bar above the ground carrying a crop to be harvested, in which the sensor fingers are controllably retractable and in which the ground pressure of the sensor fingers can be adjusted when deployed. The height control system is particularly but not exclusively suited for a swather tractor, which simply carries the header to form a swath, as the swather tractor has a lifting arrangement for raising and lowering the cutter bar that is more limited in its vertical height range and a drive system that provides higher maneuverability than that of a combine harvester. The present invention further relates to a crop harvesting machine having lateral spaced apart hydraulic linkages for controlling header height which can also be operated independently of one another to tilt the header relative to the harvester frame.

BACKGROUND

A crop harvesting machine generally includes a crop header for cutting a standing crop including a header frame, a cutter sickle extending across a front cutter bar of the header frame for cutting the crop, and a transport system operable to transport the crop to a central discharge opening of the header so as to form a swath.

The machine further includes a tractor or other vehicle for carrying the header including a tractor frame having a first end and a second end, ground wheels for supporting the tractor in movement across the ground including a pair of transversely spaced first wheels at the first end, a mounting assembly at the first end of the tractor frame for supporting the header, and a lift linkage for raising and lowering the mounting assembly.

The crop header generally includes a header frame, an elongate cutter bar along a front edge of the frame including a cutter bar beam which carries a plurality of knife guards for guiding reciprocating movement of a sickle knife across a front edge of the cutter bar. When the crop header is of the draper header type, then on the header is also mounted rearwardly of the cutter bar a draper assembly including a first and second draper guide roller each arranged at a respective end of the draper assembly spaced apart along the cutter bar with an axis of each roller extending substantially at right angles to the cutter bar, a draper forming a continuous loop of flexible material wrapped around the rollers so as to define a front edge of the draper adjacent the cutter bar, a rear edge of the draper spaced rearwardly of the cutter bar, an upper run of the draper on top of the roller and a lower run of the draper below the rollers. The cut crop thus falls rearwardly onto the upper run of the draper and is transported longitudinally of the header.

The draper header type can be used simply for forming a swath in which case the material is carried to a discharge opening of the header and deposited therefrom onto the ground. Headers of this type can also be used for feeding a combine harvester so that the materials are carried to an adapter member positioned at the discharge opening of the header for carrying the materials from the discharge opening into the feeder housing of the combine harvester. Yet further, headers of this type can be used for hay conditioners in which the material from the discharge opening is carried into crushing rolls. It will be appreciated, therefore, that the use of the header is not limited to particular types of agricultural machine but can be used with any such machine in which it is necessary to cut a standing crop and to transport that crop when cut longitudinally of the header for operation thereon.

These crop headers may employ a height control system so as to regulate a height of the cutter bar above the ground, which allows for as much if not all of the standing crop to be harvested particularly when the crop is growing on uneven terrain.

Conventional height control systems use a sensor finger which is positioned so as to extend downwardly from the header frame to the ground to determine the above ground height of the cutter bar by physical contact of the finger therewith. In view of the ground contact of the sensor fingers suited for following the ground in a forward cutting direction, the sensor fingers are readily susceptible to damage under a variety of instances when the harvester is displaced across the ground in directions other than the conventional forward cutting direction. Furthermore, these systems typically include at least one spring arranged to bias the finger against the ground so that the finger follows same, however, adjusting the downward pressure of the sensor finger when deployed involves a complex mechanical process of manually adjust the spring position.

United States Patent Application Publication No. 2017/0064904 by CNH Industrial America LLC discloses one example of a harvester having a height control feature. The method includes positioning the header to a predetermined cut height set point, measuring a ground speed of the agricultural harvester, measuring a height of the header relative to a ground surface at a plurality of positions along a length of the header. The method further includes lowering the header towards a first adjusted cut height threshold if a measured height of one of the plurality of positions is above the predetermined cut height set point and the measured ground speed is less than a first predetermined ground speed. The subject application allows the automatic header height control software on an agricultural harvester to automatically deviate from the predetermined cut height set point. The height control is limited to correcting for ground forming a crown or a swale in the direction of travel, but does not accommodate for laterally sloped terrain.

SUMMARY OF THE INVENTION

According to one aspect of the invention there is provided a crop harvesting machine comprising:
 a harvester frame having longitudinally opposed first and second ends supported for movement across ground having a crop thereon to be harvested;
 a drive system mounted on the harvester frame for propelling the harvester frame in one of a plurality of drive conditions across the ground;
 a cab mounted on the harvester frame for an operator;
 a header mounted at the first end of the harvester frame comprising a header frame with a main rear frame member and a plurality of forwardly extending frame members each supported by the main rear frame member, and an elongate cutter bar connected to the forward end of the forwardly extending frame members so as to be arranged along a front edge of the header frame for cutting the crop;

a height control system for controlling a height of the header relative to the ground, the height control system comprising:
  a sensor assembly arranged to determine height of the cutter bar above the ground, the sensor assembly including (i) a sensor finger which is elongate between a top portion of the finger pivotally supported on the header and a bottom portion of the finger distal from the top portion such that the sensor finger is movable between a working position in which the finger depends from the top portion below the header frame to the bottom portion of the finger which is spaced below the header frame for engaging the ground and following contours of the ground and a raised position in which said bottom portion of the sensor finger is in close proximity to the header frame and (ii) a position sensor arranged to generate an output signal corresponding to the height of the header relative to the ground based upon a position of the sensor finger;
  a lift linkage operable between the header frame and the harvester frame to raise and lower the header frame relative to the harvester frame responsive to the output signal of the position sensor to position the cutter bar at a prescribed height;
a controller arranged to generate a lift signal; and
a sensor positioning assembly operatively coupled to the controller so as to be arranged to lift the sensor finger from the working position to the raised position responsive to the lift signal from the controller.

Thus, upon command from an operator, or upon detection of an operating condition of the header or the tractor during which it is possible for the finger to become damaged, the sensor finger can be automatically retracted from the working position to the raised position in which the finger is free from contact with the ground.

This is particularly suited for swather or windrower tractors which are highly manoeuvrable and can be steered on the spot or reversed while cutting which can impose damaging loads on the sensor fingers which typically only tolerate deflection when moving in the working direction. However, this type of system may also be used with a combine harvester as it may reduce need to lift the whole of the header frame so as to avoid damage to the sensor when re-positioning the crop harvesting machine for example prior to further crop cutting.

In general therefore the arrangement as described in more detail hereinafter provides a sensor with a finger which is movable between a working position and a raised position and is thus provided with a first mechanism which deploys and biases the finger to the working position against the ground and a second mechanism which opposes the biasing direction of the first mechanism so that the finger can be retracted from the working position to the raised position upon detection of particular drive conditions of the tractor in which damage to the finger may occur.

The sensor finger preferably includes a biasing member to bias the sensor finger towards one of the raised position and the working position and wherein the sensor positioning assembly includes an actuator operable to produce a biasing force acting against the biasing member to position the sensor finger in the other one of the raised position and the working position in which the actuator is responsive to the lift signal from the controller to displace the sensor finger from the working position to the raised position. In the illustrated embodiment, the biasing member acts to urge the sensor finger towards the raised position and the actuator acts to urge the sensor finger towards the working position.

According to another important independent aspect of the invention, the sensor positioning assembly includes an actuator operable in the working position to control a downward pressure of the sensor finger on the ground according to a set point pressure within a range of downward pressures in which the set point pressure is controllably adjustable by the controller. Preferably, the set point pressure is automatically controlled by the controller responsive to a height of the header frame. In the illustrated embodiment, the actuator of the sensor positioning assembly is a hydraulic actuator and the downward pressure is controlled by using the controller to control a hydraulic pressure supplied to the actuator from a hydraulic supply on the harvester frame.

The hydraulic supply may be operable to vary the prescribed pressure supplied to the actuator throughout of range of pressures in the working position to maintain engagement of the sensor finger with the ground through a range of heights of the header frame relative to the ground.

The controller may be further arranged to reduce the prescribe pressure supplied by the hydraulic supply to the actuator to a reduced pressure corresponding to a force applied to the sensor finger by the actuator being exceeded by a force applied to the sensor finger by the spring for raising the sensor finger to the raised position The controller may include a sensor lifting criterion stored thereon in which the controller is arranged to generate the lift signal when a prescribed operating condition of the crop harvesting machine meets the sensor lifting criterion. The sensor lifting criterion may include (i) a non-cutting position of the header such that the controller is arranged to generate the lift signal when the header is lifted out of a cutting position of the header, (ii) a reverse travel criterion such that the controller is arranged to generate the lift signal when the harvester frame is operated in a reverse direction opposite to a normal forward direction for cutting crop, in which the controller may be operatively coupled to an operative drive selector in the operator cab to determine the operating condition and if the reverse travel criterion has been met, or (iii) a turning criterion corresponding to a turning radius of the harvester frame exceeding a turning radius limit, in which the controller may be operatively coupled to the drive system so as to be arranged to measure relative wheel speed between laterally opposed drive wheels on the harvester frame to determine the turning radius of the harvester frame if the turning criterion has been met, or (iv) any combination of the above.

The sensor finger is preferably contained within a lower boundary of the header frame in the raised position, for example so that the bottom portion of the sensor finger is supported at or above a bottom side of the beams in the raised position. According to another important independent aspect of the present invention, when the sensor finger is pivotal between the working position and the raised position about a finger pivot axis, the crop harvesting machine may further comprise a resilient bushing pivotally supporting the sensor finger relative to the header frame such that the sensor finger can be angularly deflected relative to the finger pivot axis.

Preferably, the crop harvesting machine comprises a plurality of sensor assemblies at spaced apart positions across the header frame and a sensor positioning assembly associated with each sensor assembly which is responsive to said controller.

According to another important independent aspect of the present invention there is provided a crop harvesting machine comprising:
- a harvester frame having longitudinally opposed first and second ends supported for movement across ground having a crop thereon to be harvested;
- a drive system mounted on the harvester frame for propelling the harvester frame in one of a plurality of drive conditions across the ground;
- a cab mounted on the harvester frame for an operator;
- a header mounted at the first end of the harvester frame comprising a header frame with a main rear frame member and a plurality of forwardly extending frame members each supported by the main rear frame member, and an elongate cutter bar connected to the forward end of the forwardly extending frame members so as to be arranged along a front edge of the header frame for cutting the crop;
- a height control system for controlling a height of the header relative to the ground, the height control system comprising:
  - a sensor assembly arranged to determine height of the cutter bar above the ground, the sensor assembly including (i) a sensor finger which is elongate between a top portion of the finger pivotally supported on the header and a bottom portion of the finger distal from the top portion such that the sensor finger is movable between a working position in which the finger depends from the top portion below the header frame to the bottom portion of the finger which is spaced below the header frame for engaging the ground and following contours of the ground and a raised position in which said bottom portion of the sensor finger is in close proximity to the header frame and (ii) a position sensor arranged to generate an output signal corresponding to the height of the header relative to the ground based upon a position of the sensor finger;
  - a lift linkage operable between the header frame and the harvester frame to raise and lower the header frame relative to the harvester frame responsive to the output signal of the position sensor to position the cutter bar at a prescribed height; and
  - a sensor positioning assembly operatively coupled between the sensor finger and the header including an actuator operable to control a downward pressure of the sensor finger on the ground according to a set point pressure within a range of downward pressures; and
  - a controller arranged to controllably adjust the set point pressure.

The set point pressure may be automatically controlled by the controller responsive to a height of the header frame, and/or may be controllable by an operator control in the cab.

The sensor positioning assembly in this instance may also include a biasing member to bias the sensor finger towards one of the raised position and the working position and an actuator operable to produce a biasing force acting against the biasing member to position the sensor finger in another one of the raised position and the working position in which the actuator is responsive to the lift signal from the controller to displace the sensor finger from the working position to the raised position.

According to another important independent aspect of the present invention there is provided a crop harvesting machine comprising:
- a harvester frame supported for movement across ground having a crop thereon to be harvested;
- a cab mounted on the harvester frame for an operator;
- a header mounted on the harvester frame comprising a header frame and an elongate cutter bar connected to the forward end of the forwardly extending frame members so as to be arranged along a front edge of the header frame for cutting the crop;
- a drive system mounted on the harvester frame for propelling the harvester frame across the ground in a forward working direction when cutting crop;
- a height control system for controlling a height of the header relative to the ground, the height control system comprising:
  - a first lift linkage and a second lift linkage operatively connected between the harvester frame and the header frame at laterally spaced apart positions so as to be associated with laterally opposed first and second side portions of the header frame respectively;
  - at least one first height sensor associated with the first side portion of the header frame so as to be arranged to generate a first height signal representative of a respective height of the first side portion of the header frame above the ground;
  - at least one second height sensor associated with the second side portion of the header frame so as to be arranged to generate a second height signal representative of a respective height of the second side portion of the header frame above the ground;
  - a height controller operatively connected to the height sensors and the first and second lift linkages so as to be arranged to operate the first and second lift linkages at different elevations relative to one another responsive to the first height signal and the second height signal such that the header frame is controllably tiltable relative to the harvester frame about a tilt axis oriented in the forward working direction.

The height sensors according to this aspect of the invention may comprise any suitable mechanism for measuring height of the header relative to the ground, including sensor fingers according to the preferred embodiment described herein, or alternatively ultrasound sensors, radar sensors, or optical sensors, and the like.

In some embodiments, the height controller may be arranged to independently adjust each lift linkage responsive to the respective height signal that is associated with that side portion of the header frame deviating from a prescribed height.

Alternatively, the height controller may be arranged to proportionally adjust the first and second lift linkages relative to one another responsive to a difference between the first height signal and the second height signal exceeding a prescribed threshold.

The height controller is preferably also arranged to adjust both lift linkages in the same direction to adjust an overall height of the header frame relative to the harvester frame responsive to a combined height of the first and second height signals deviating from a prescribed height.

In each instance, the prescribed height is preferably stored on the height controller and the prescribed height is adjustable using operator controls in the cab.

In another embodiment, said at least one first height sensor may comprise two first height sensors at laterally spaced apart positions along the first side portion of the header frame and said at least one second height sensor may comprise two second height sensors at laterally spaced part positions along the second side portion of the header frame, in which the height controller is arranged to operate the first and second lift linkages so as to optimize the height signal from each of the height sensors to the prescribed height.

The height controller may be further arranged to operate the first and second lift linkages so as to maintain a minimum header height at each of the height sensor locations.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The following description relates only those parts of the header and tractor which are of importance to the present invention and the remaining parts of the header including the frame structure, drives, ground wheels and the like are omitted as these will be well known to one skilled in the art.

There is illustrated in the accompanying drawings a crop harvesting machine including tractor 10 and a header 23 for harvesting a crop.

Figure 1:
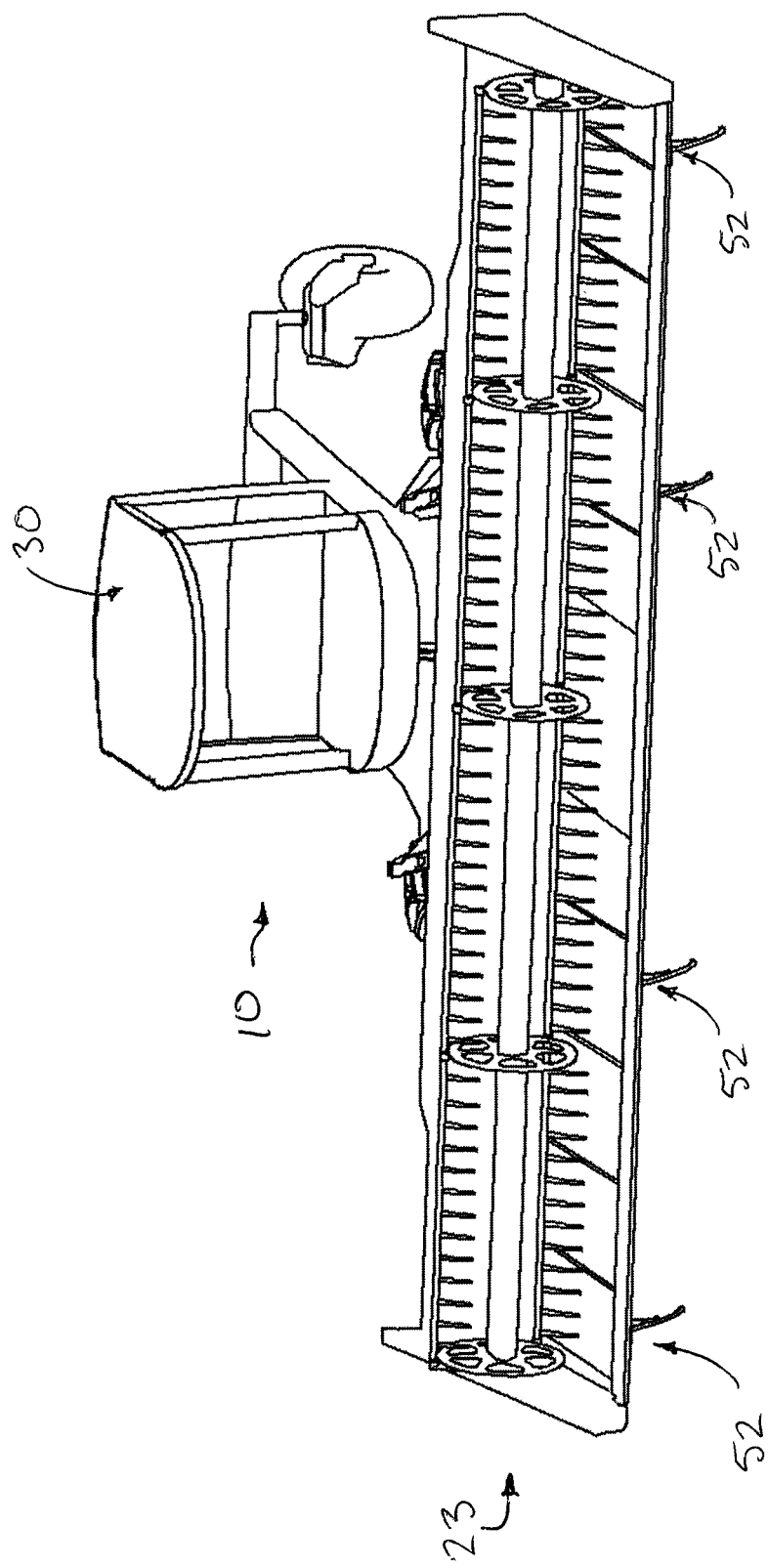
FIG. 1 is a perspective view of a crop harvesting machine including a header supporting a plurality of sensor assemblies of a height control system thereon.
Figure 2:
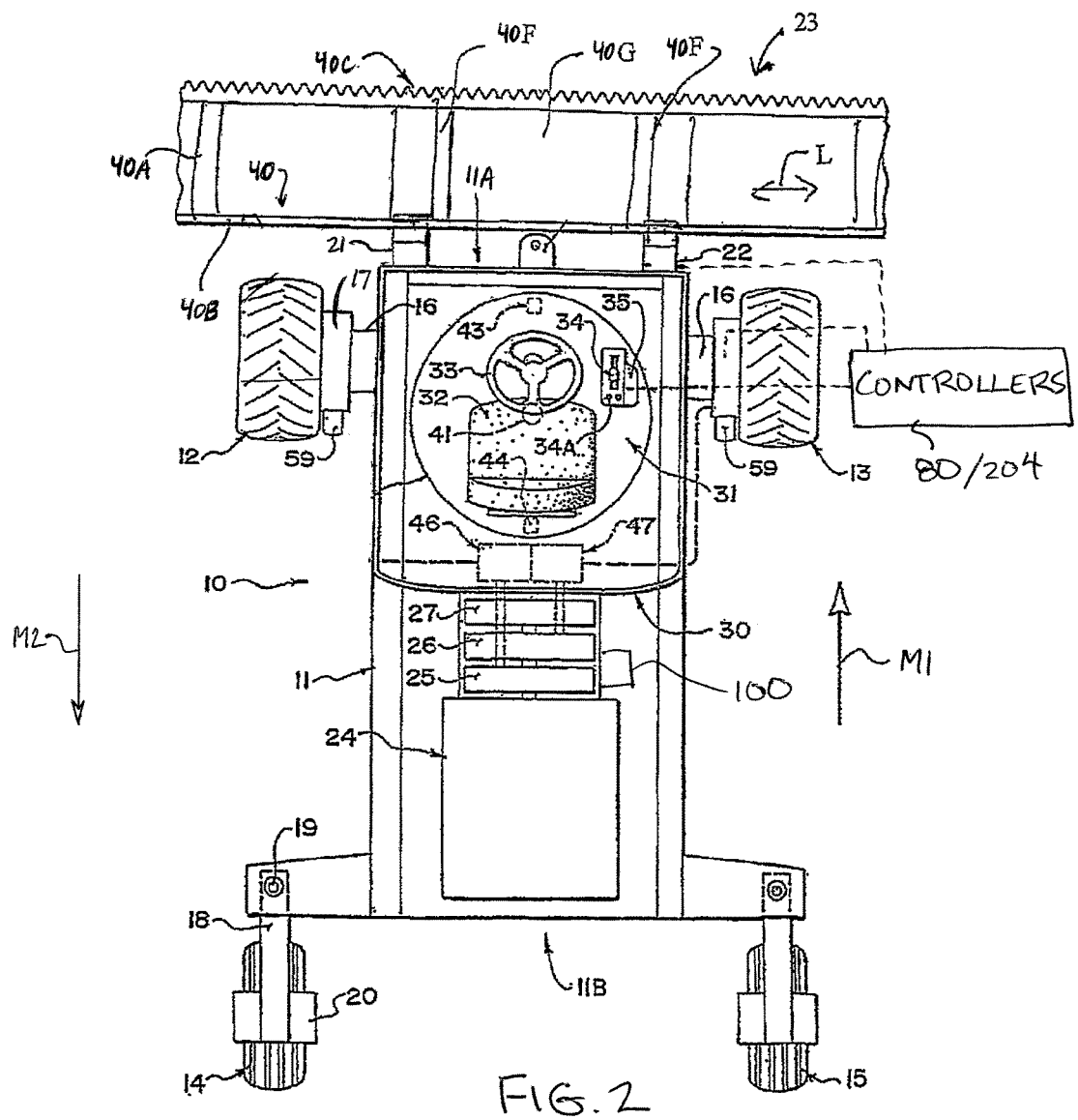
FIG. 2 is a top plan view of the crop harvesting machine according to FIG. 1.
Figure 3:
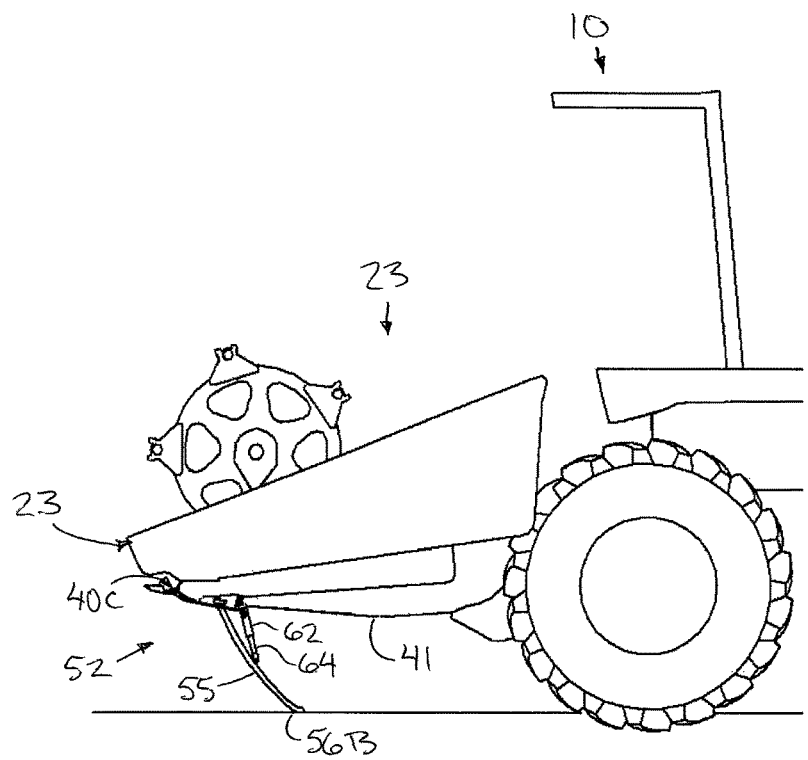
FIG. 3 is an end elevational view of the header of the crop harvesting machine according to FIG. 1 in a working position of the height control system.
Figure 4:
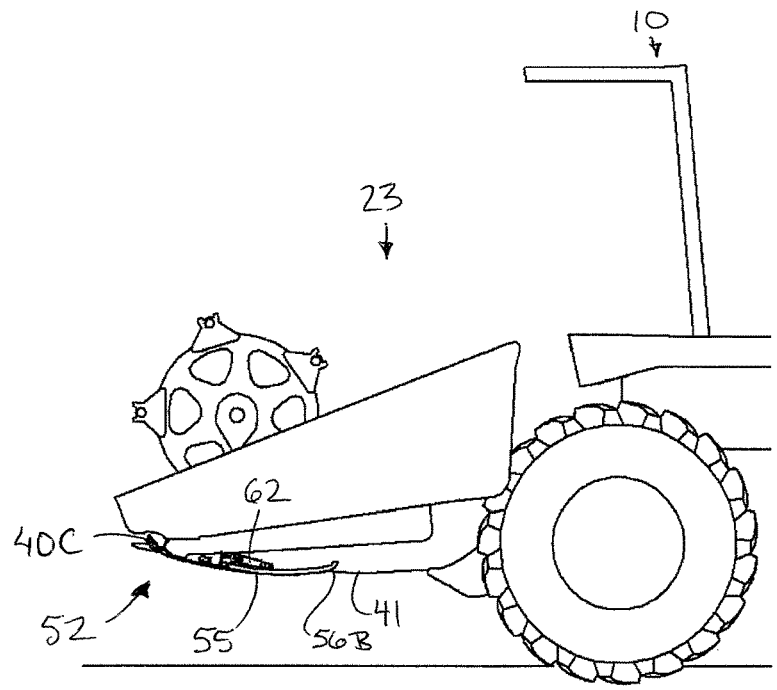
FIG. 4 is an end elevational view of the header of the crop harvesting machine according to FIG. 1 in a raised position of the height control system.
Figure 5:
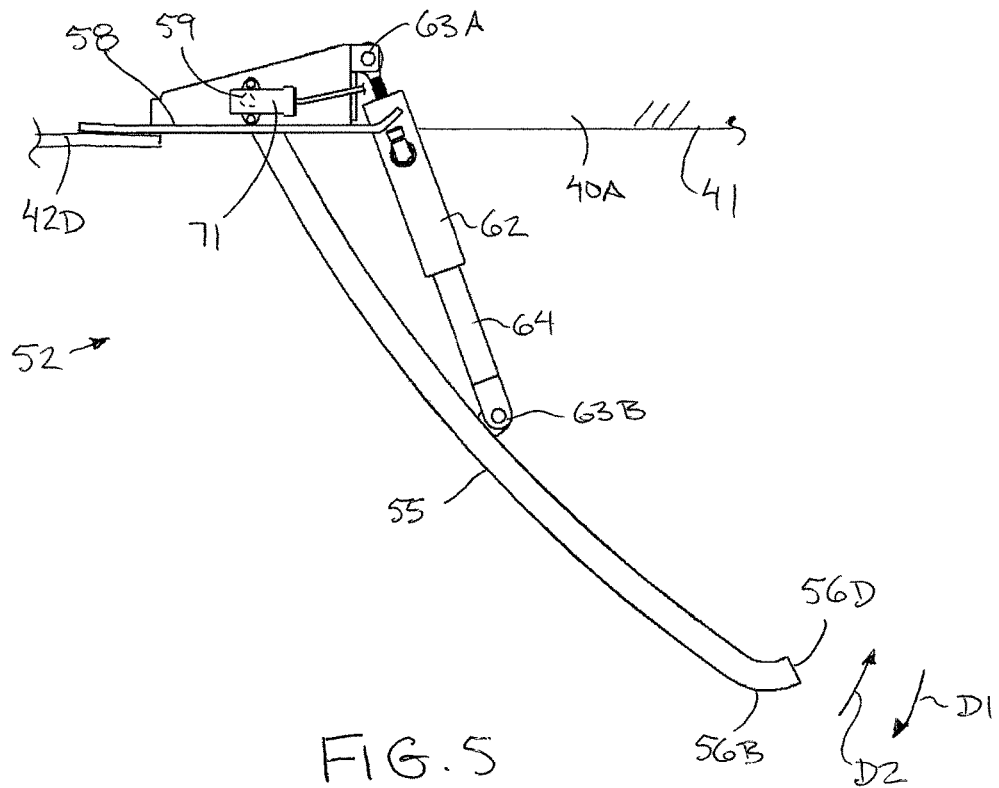
FIG. 5 illustrates in elevational view one of the sensor assemblies of the height control system in a working position.
Figure 6:
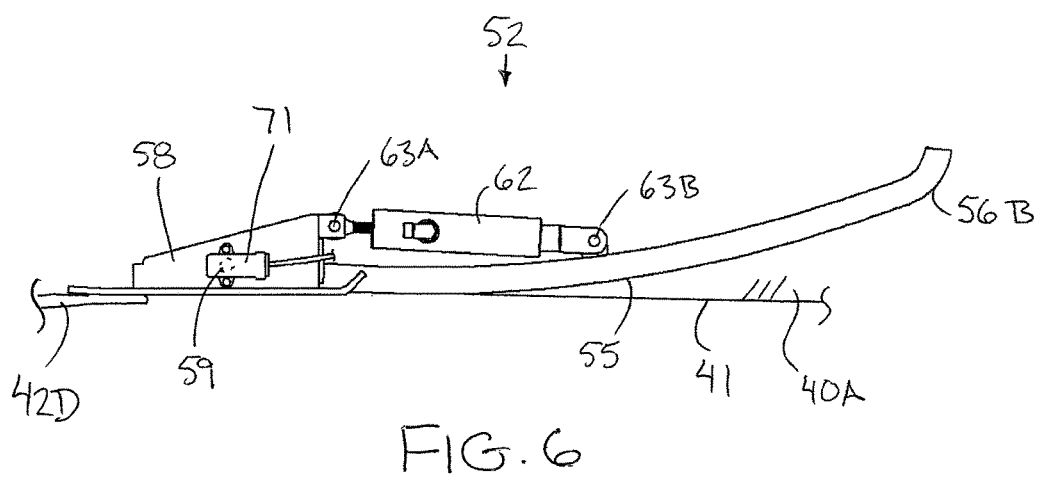
FIG. 6 illustrates in elevational view one of the sensor assemblies of the height control system in a raised position.
Figure 7:
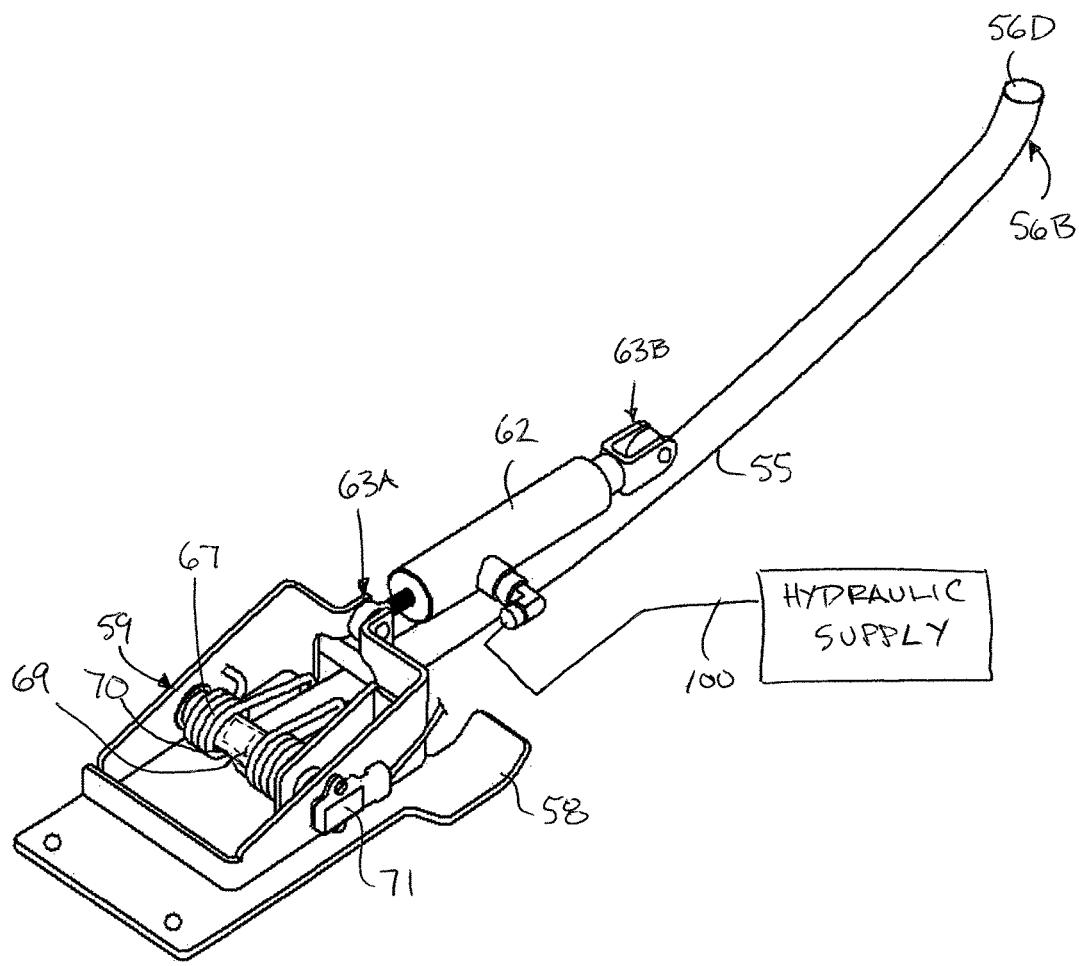
FIG. 7 is a perspective view of one of the sensor assemblies of the height control system.
Figure 8:
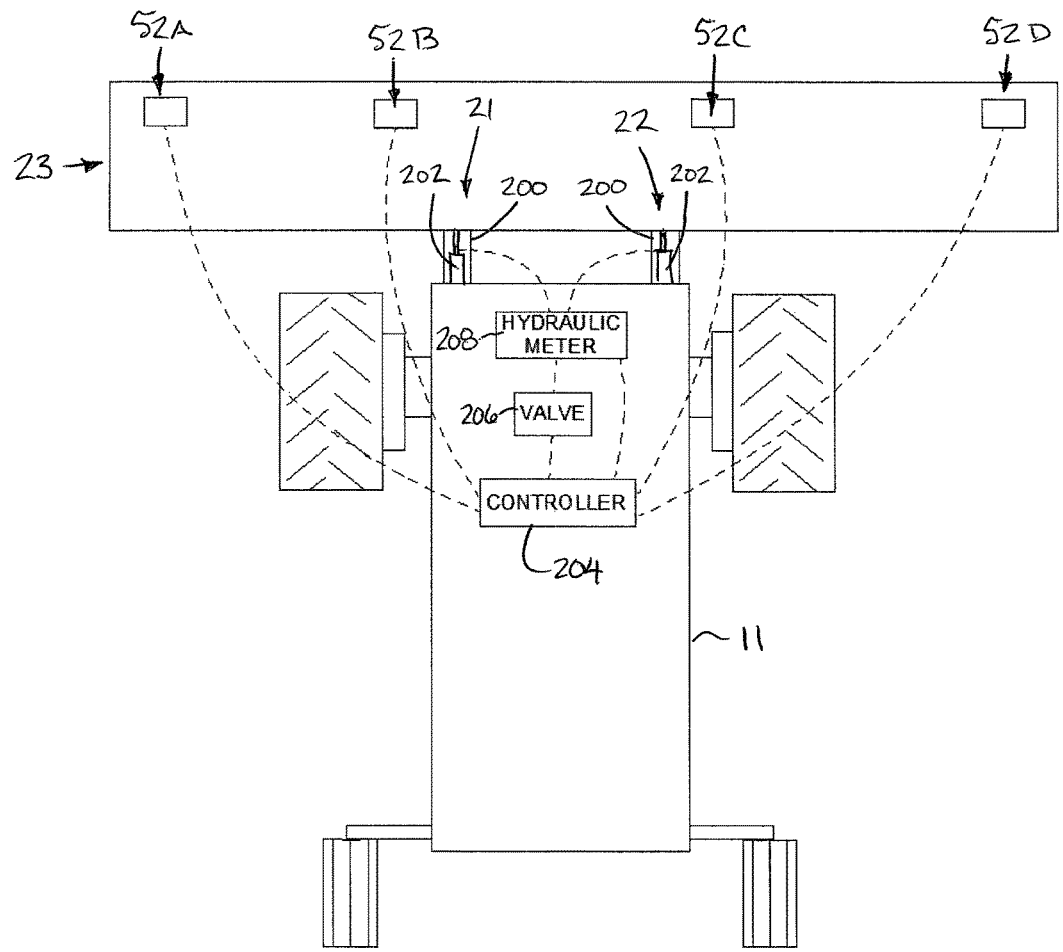
FIG. 8 is a top plan view of the crop harvesting machine according to FIG. 1 including components of the height control system represented schematically thereon.

A swather tractor which is indicated at 10 includes a frame 11 which is carried on a first pair of driven ground wheels 12 and 13 and on a second pair of non-driven castor wheels 14 and 15 so that the frame is supported for movement across the ground. The driven wheels 12 and 13 are mounted on suitable supports 16 which support the ground wheels relative to the frame 11. The driven ground wheels 12 and 13 are each driven by a hydraulic motor 17 carried on the support 16 which receives hydraulic fluid under pressure from a supply line and drives the ground wheel at a rate of rotation dependent upon the rate of flow of the hydraulic fluid. As such there is formed a drive system of the tractor for propelling the crop harvesting machine across the ground carrying the crop to be harvested. The swather tractor 10 is operable in a harvesting mode and in a transport mode. In the harvesting mode, it is normally driven in a forward working direction M1 with a cab 30 oriented as shown in FIG. 1 so that the driver is overlooking a header 23 mounted on the tractor during normal forward movement for cutting a crop. The swather tractor can also operate in a reverse direction in the harvesting mode. In the transport mode, the cab 30 is oriented so that the driver is overlooking an engine 24 of the tractor so that the tractor is well suited to be driven in an opposing transport direction corresponding to direction of arrow M2, that is opposite to the forward working direction for cutting crop in the harvesting mode.

The wheels 14 and 15 are mounted on conventional castors 18 which swivel about a castor pin 19. The ground wheels 14 and 15 are non-driven and are simply mounted in a supporting bracket 20 which can pivot around the castor pin 19 so that the castor wheels follow the movement of the vehicle as controlled by the driven wheels 12 and 13. Thus the speed of the vehicle over the ground is controlled by the rate of rotation of the wheels 12 and 13 and steering is controlled by a differential in speed between the wheels 12 and 13.

The drive system is operable to drive the tractor frame according to various drive conditions. The drive conditions include driving in the normal forward direction M1 in the normal harvesting configuration or in an opposing rearward direction M2 when the operator within the cab selects the rearward direction using the drive selector for reversing the tractor in the harvesting mode, or alternatively for moving forwardly in the direction M2 that the operator faces in the transport mode.

The header frame is shown only schematically since this can vary widely in accordance with requirements as is well known to a person skilled in this art. At the driven end 11A of the frame is mounted a first hydraulic height control linkage 21 and a second hydraulic height control linkage 22 at laterally spaced apart positions for carrying the header 23 at an adjustable height relative to the frame. Each of the height control linkages 21 and 22 comprises a mechanical linkage 200, for example a pair of parallel links pivotally coupled between the header frame and the tractor frame, and a hydraulic linear actuator 202 operatively connected between the header frame and the tractor frame to control pivotal movement of the mechanical linkage as the actuator is extended and retracted to raise or lower the header frame and the cutter bar on the header frame relative to the tractor frame. These elements are well known to persons skilled in this art and various different designs can be used and accordingly, the height control linkages 21, 22 are shown only schematically. In some embodiments, the pivotal connections of the mechanical linkages 200 of the height control linkages 21 and 22 are further configured to allow some relative flexing of the header about a tilt axis oriented in the forward cutting direction of the header as described in further detail below.

Various different types of headers can be used including disc type cutters or sickle knife cutters. The width of the header in the lateral direction can vary considerably depending upon the type of crop and the cutting system employed. The header is preferably carried on the height control linkages 21, 22 of the tractor which are operable to raise and lower the header on the tractor between different working positions and between working positions and a raised position cleared from the ground for moving the header over the ground when not in working position.

The tractor includes the engine 24 carried on the frame 11 adjacent a second end 11B of the frame. The engine is arranged to drive a series of hydraulic pumps 25, 26 and 27 for generating pressurized hydraulic fluid of a hydraulic fluid supply system of the tractor for driving the various components of the tractor as described hereinafter. Separate pumps can be used as shown or single pump can be used with the hydraulic fluid under pressure generated thereby being separated into separate controlled fluid paths for operating the various components.

The hydraulic fluid supply system 25, 26, and 27 of the tractor includes a pressure regulated output 100 which includes a pressure reducing and pressure relieving valve for outputting hydraulic fluid at a prescribed pressure for use by some of the components of the tractor as described in further detail below. The magnitude of the prescribed pressure can be adjusted by an operator of the tractor using suitable hydraulic controls in the cab of the tractor.

At the driven end 11A of the frame is provided the cab 30 which sits over the driven end between the driven wheels 12 and 13 so the operator can look over the header during the cutting action on the field. The cab 30 encloses an operator console generally indicated at 31 which includes a seat 32, a steering control 33 in the form of a conventional steering wheel, a speed and drive control 34 and an accessory control 35.

The header 23 includes an elongate header frame 23B defined by a main beam 23C and forwardly extending legs 23D which carry a cutter bar 23A.

The header 23 comprises an elongate header frame 40, a rear support frame structure 40B and a plurality of beams 40A extending horizontally and forwardly from the rear support frame structure 40B to a cutter bar generally indicated at 40C for support of that cutter bar across the front of the header. The plurality of forwardly extending frame members or beams 40A are arranged at spaced positions along the length of the header frame so as to support the cutter bar 40C as an elongate structure across the front edge of the header. The cutter extends longitudinally along the front cutter bar of the header frame for cutting the crop when the header is moved in the forward working direction at M1 generally at a right angle to its longitudinal direction L. Different types of cutter bars can be used but the typical example comprises a sickle knife. A crop transport system 40F, generally drapers but other systems can be used, is provided for transporting the crop longitudinally of the header to a central discharge opening 40G of the header so as to form a swath to be deposited on the ground between the wheels 12, 13 of the tractor.

The cutter bar comprises a generally Y-shaped beam 42 with a leg and two branches. The lower branch 42D forms a rearwardly and downwardly extending wall which acts as a skid plate when the cutter bar is cutting on the ground. The plate may be covered by a protective plastics wear shield (not shown).

A height control system is provided in conjunction with the lift linkages 21, 22 in which the height control system comprises a plurality of sensor assemblies 52 so that the cutter bar 42 may be maintained at a prescribed height relative to the ground so as to cut the crop. This type of system is particularly useful when the ground carrying the crop is uneven so that the height of the cutter bar may be adjusted so that a uniform height of crop is harvested.

The sensor assemblies 52 of the height control system are spaced from one another longitudinally of the header, across a width of the tractor frame. Each sensor assembly 52 forms a finger 55 elongated from a top end 56A pivotally attached via bracket 58 at the header frame 41, specifically to the cutter bar 40C at the bottom branch 42D, to a trailing bottom portion 56B distal from the top end and forming a terminus of the finger opposite the top end.

The finger is positionable in a working position so as to extend below the header frame at a downward and rearward slope relative to the forward cutting direction, with its bottom portion 56B in spaced relation to the header frame at a position in contact with the ground, and in a raised position wherein the bottom portion is spaced upwardly from the ground and upwardly relative to the working position so as to be free of contact with the ground. More particularly, in the raised position, the bottom portion 56B is located in close proximity to the header frame so as to be generally contained above a lower boundary of the header frame. That is, in the raised position the bottom portion 56B of the finger is located at or above bottom surfaces 41 of the forwardly extending beams 40A.

In the illustrated arrangement, the finger 55 is formed from rigid tubular material which is curved to be convex at the leading side when moving in the forward harvesting direction of the header frame so that the finger follows an arcuate path from its top end 56A to the bottom portion 56B. At the bottom portion 56B there is defined an end portion 56D which is deflected rearwardly and upwardly relative to a remainder of the body of the finger to maintain a convex arcuate leading surface for sliding movement across the ground.

The finger 55 is pivotal between the working position and the raised position about a shaft 59 supported at the bracket 58 defining a pivot axis of the finger. The shaft is oriented generally longitudinally of the header so that the elongate finger is oriented longitudinally of the tractor thereby being arranged to lie in a vertical plane parallel to the forward working direction M1 of the tractor in a normal working position.

A collar 70 is provided at the top end 56A of the finger which is rotatably supported about the shaft 59 to rotate with the finger supported thereon. A sleeve-shaped rubber bushing 69 surrounds the shaft 59 at the location of the collar of the finger such that the bushing is received between the collar of the finger and the shaft. In this instance, the finger is biased to a neutral position in the lateral direction to remain pivotal between working and raised positions within a plane of rotation perpendicular to the shaft, however, the finger can be angular deflected away from the neutral position so as to be offset from the pivot axis defined by the shaft within a range of offset angles by deforming the bushing. This allows the finger to be deflectable relative to the shaft in directions transverse of the finger, or in other words directions generally parallel to the shaft, where such deflection may occur for example upon sharp turning of the tractor operating in the harvesting mode when moving generally in the forward working direction.

In a normal working position, the bottom portion 56B of the finger is arranged below the cutter bar at the ground so that the finger 55 follows a contour of the ground, and an angular position of the finger with respect to the shaft is measurable with an appropriate position sensor, for example a transducer 71, to determine a present height of the cutter bar above the ground. The position sensor thus generates an output signal corresponding to the height of the header relative to the ground based upon a position of the sensor finger.

According to this output signal generated by the transducers of the position sensors, a height controller 204, which receives the output signals from the height sensors, controls the operation of valves and hydraulic meters between the hydraulic supply 100 and the hydraulic actuators 202 of the linkages 21 and 22 to adjust the position of the hydraulic actuators and the resulting height of the header relative to the ground. The height controller is a computer device which includes a processor for executing programming stored on a memory of the controller to perform the various functions of the controller described herein. Typically, the height controller operates the hydraulic actuators 202 of the linkages 21 and 22 responsive to the output signals from the height sensors if the measured heights differ from a prescribed height so as to maintain the cutter bar height at that prescribed height. The prescribed height is a stored value on the controller that can be readily adjusted by the operator using operator controls within the cab.

More particularly, the header frame includes a first side portion extending laterally outwardly beyond the first hydraulic lift linkage 21, and a second side portion extending laterally outwardly opposite to the first side portion beyond the second hydraulic lift linkage 22 such that the respective height of the first and second side portions of the header frame can be independently controlled by adjusting the position of the first and second hydraulic lift linkages respectively. The height sensors 52 in this instance are all laterally spaced apart from one another along the header frame to include (i) a first outer sensor 52A adjacent the first end of the header frame, (ii) a first inner sensor 52B at an intermediate location along the first side portion between the first hydraulic lift linkage 21 and the first outer sensor 52A, (iii) a second outer sensor 52D adjacent the second end of the header frame, and (iv) a second inner sensor 52C at an intermediate location along the second side portion between the second hydraulic lift linkage 22 and the second outer sensor 52D.

In one mode of operation of the height controller, when it is desirable to only control overall height of the header frame, the height signals from all of the height sensors are collectively received by the height controller 204, and the height controller simultaneously operates both hydraulic lift linkages 21 and 22 always in the same direction by the same amount together to simultaneously raise or simultaneously lower the lift linkages to raise or lower the overall header frame relative to the harvester frame while maintaining a generally horizontal and parallel orientation of the header frame relative to the harvester frame. In this instance, all of the height signals are combined to determine a representative height of the overall header frame, for example by averaging the height signals, and the hydraulic lift linkages 21 and 22 are operated to raise or lower the overall header frame if the representative height is either below or above the prescribed height stored on the height controller respectively. Additional criteria may be employed such as maintaining a minimum height at each sensor location, or by only adjusting the lift linkages if the representative height differs from the prescribed height by an amount which exceeds a permissible threshold amount. In a further mode of operation of the height controller, the overall height of the header frame and an angular orientation of the header frame about a tilt axis oriented in the forward working direction can be controlled. In this instance the height controller can operate the first and second hydraulic lift linkages at different elevations relative to one another responsive to height signals from the first height sensors 52A and 52B and the second height sensors 52C and 52D respectively such that the header frame is controllably tiltable relative to the harvester frame about the tilt axis in addition to the overall height being controller.

More particularly, the height signals from both first sensors associated with the first side portion of the header frame are combined to determine a first representative height associated with the first side portion of the header frame, while the height signals from both second sensors associated with the second side portion of the header frame are combined to determine a second representative height associated with the second side portion of the header frame. Each representative height determined by the height controller may be an average of the two height signals, a weighted average of the two height signals proportional to the lateral distance from the tilt axis, or any other suitable means of generating a height which is representative of an overall side portion of the header frame as opposed to a single location on the header frame.

In a preferred embodiment, the height controller operates a primary valve 206 which supplies hydraulic fluid to both lift linkages 21 and 22 to control an overall elevation or height of both linkages and thus the overall height of the header frame relative to the harvester frame and the ground. In this manner, the height controller is arranged to adjust both lift linkages in the same direction to adjust an overall height of the header frame relative to the harvester frame responsive to a combined height of the first and second height signals deviating from a prescribed height. In one embodiment, increasing the overall supply of fluid will extend both actuators 202 of the linkages 21 and 22 to raise both linkages and raise the overall header, whereas decreasing the overall supply of fluid will retract both actuators 202 of the linkages 21 and 22 to lower both linkages and lower the overall header.

The height controller also operates a hydraulic meter 208 that functions as a proportional control between the supply of hydraulic fluid from the primary valve 206 to each of the lift linkages 21 and 22. In a neutral position, hydraulic fluid is supplied equally to both lift linkages to maintain a horizontal and parallel orientation of the header frame relative to the harvester frame and the ground; however, the height controller is arranged to proportionally adjust the supply of hydraulic fluid to the first and second lift linkages relative to one another responsive to a difference between the first height signal and the second height signal exceeding a prescribed threshold. In one example, if the height of the first side portion of the header frame exceeds the height of the second side portion of the header frame by the prescribed threshold amount, the height controller proportionally adjusts the flow of hydraulic fluid according to a first deviated position so that the first linkage is lowered and the second linkage is raised simultaneously. Alternatively, if the height of the second side portion of the header frame exceeds the height of the first side portion of the header frame by the prescribed threshold amount, the height controller proportionally adjusts the flow of hydraulic fluid according to a second deviated position so that the second linkage is lowered and the first linkage is raised simultaneously. The proportional adjustment thus maintains the overall height of the header frame relative to the harvester frame, but will function to tilt the header frame relative to the harvester frame about the tilt axis that is oriented in the forward working direction.

In another embodiment, the height controller may operate each lift linkage independently of the other linkage. In this instance, the height controller may adjust the first hydraulic lift linkage 21 responsive to a first representative height associated with the first side portion of the header frame which deviates from the prescribed height set by the operator. Accordingly, a representative height below the prescribed height will result in operating the lift linkage 21 to raise the corresponding first side portion of the header frame, and operating the lift linkage to lower the first side portion of the header frame if it is above the prescribed height. Likewise, the height controller will adjust the second hydraulic lift linkage 22 responsive to a second representative height associated with the second side portion of the header frame which deviates from the prescribed height set by the operator such that a representative height below the prescribed height will result in operating the lift linkage to raise the corresponding second side portion of the frame, and operating the lift linkage to lower the second side portion of the header frame if it is above the prescribed height.

The height controller may also be operated to ensure various additional criteria are met such as maintaining a minimum header height at each of the height sensor locations. Furthermore, the height controller may be arranged such that no adjustments are made unless a deviation of the representative height determined by the sensors from the prescribed height exceeds a minimum threshold for applying a correction. In general, the controller is configured to operate in any suitable manner resulting in the lift linkages 21 and 22 being able to be controlled at different elevations so as to collectively optimize in real-time the height signal generated by each of the height sensors to be as close as possible to the prescribed height, thereby resulting in adjustment of both angular orientation about the tilt axis and the overall height of the header frame relative to the harvester frame and relative to the ground.

To control the positioning of the finger between the working and raised positions, a sensor positioning assembly is provided including (i) a hydraulic actuator 62 operable to lower the finger towards the working position in the direction D1 when actuated with increasing hydraulic pressure for maintaining the finger in the working position engaged with the ground at a substantially even ground pressure as the ground varies in contour in use, and (ii) a spring 67 to provide an opposing bias to the finger acting upwardly in direction D2 against the actuator 62 and towards the raised position. Thus, the actuator 62 and the spring 67 are operated in opposition to one another but as an overall system which achieves positioning of the sensor finger in the desired position by controlling pressure within the actuator 62.

In alternative embodiments, the spring 67 make take various forms of biasing elements including for example elastomer torsion elements, or a hydraulic pressure via a double acting cylinder functioning as the actuator 62 in one instance or a second single acting cylinder in addition to the single acting cylinder of the actuator 62 in another instance. In yet further arrangements, the biasing element and the actuator could be reversed so that the biasing force which retracts the sensor fingers is a controlled hydraulic pressure of the actuator and the downward force is provided by a biasing element such as the spring.

According to the illustrated embodiment, to control the pressure of the actuator 62, the actuator 62 is coupled to the pressure regulated output 100 of the hydraulic supply system of the tractor and the sensor positioning assembly includes a sensor controller 80 for (i) determining when to raise and lower the finger between the working position and the raised position based on sensor lifting criteria stored on the controller, and (ii) adjusting the prescribed pressure output by the hydraulic supply system to the actuator in order to accomplish raised and lowering of the sensor finger. The sensor controller is a computer device which includes a processor for executing programming stored on a memory of the controller to perform the various functions of the controller described herein.

The spring 67 in the illustrated embodiment is a helical spring mounted coaxially about the shaft 59 of the finger and is operatively connected between the header frame and the finger to provide a torsional bias to the finger and bias the finger in the direction D2.

The hydraulic actuator 62 is a piston cylinder type actuator which is pivotally mounted at a top cylinder end thereof 63A at a location spaced rearwardly from the pivotal connection at the top end of the finger on the bracket 58 at a fixed location relative to the header frame. The bottom piston end 63B of the actuator 62 is pivotally connected at a rear side of the finger to an intermediate location therealong between the top end 56A and the bottom portion 56B, spaced from the pivot axis of the finger.

The hydraulic actuator 62 is a single acting cylinder which is operated by pumping fluid through supply lines into its chamber to extend the piston rod 64 when pressure of the supplied hydraulic fluid is increased thereby acting to displace the finger 55 downwardly towards the working position. In this manner, the actuator biases the finger in a direction D1 to deploy the finger into the working position. The actuator is thus also usable to apply various amounts of downward pressure to hold the bottom portion of the finger against the ground.

In a normal operating condition for cutting crop in the forward working direction of the harvesting mode, when it is desirable for the sensor fingers to be deployed in the working position, the prescribed pressure of hydraulic fluid supplied to the actuator 62 corresponds to a pressure which is sufficient to generate a downward biasing force or biasing torque acting on the finger which exceeds the upward biasing torque acting on the sensor finger by the spring 67. The amount of excess biasing torque provided by the hydraulic actuator 62 relative to the spring 67 determines the downward pressure of the sensor finger on the ground.

Operator controls which are accessible by the operator within the cab may be provided to allow the operator to adjust the prescribed pressure for operating in the normal operating condition which effectively adjusts the downward pressure of the sensor fingers on the ground. In this manner, the operator can make accommodations for different ground conditions, for example wet or dry conditions, or different types of crops overlying the ground which can affect how closely the sensor fingers follow the contours of the ground.

The prescribed operating pressure of fluid supplied to the actuator 62 can also be automatically controlled by the controller to vary according to the operating height of the cutter bar relative to the ground. Due to the configuration of the linkage, a constant hydraulic fluid pressure at the actuator 62 may result in different amounts of pressure of the bottom portion of the sensor finger against the ground throughout the range of movement of the sensor finger in the working position corresponding to different heights of the cutter bar relative to the ground. To accommodate for this, the controller may vary the amount of hydraulic fluid pressure provided to the actuator 62 proportionally to the height of the cutter bar relative to the ground so as to maintain a constant pressure of the bottom portion of the sensor fingers engaged upon the ground.

In this instance the sensor positioning assembly, which comprises the actuator 62 and the biasing spring, is operatively coupled between the sensor finger and the header such that the actuator is operable to control a downward pressure of the sensor finger on the ground according to a set point pressure within a range of downward pressures, and the controller is arranged to controllably adjust the set point pressure. Preferably the set point pressure is automatically controlled by the controller responsive to a height of the header frame, however, the operator may also manually adjust the downward pressure if desired. When the actuator is a hydraulic actuator as described herein, the downward pressure is controlled by using the controller to control the hydraulic pressure supplied to the actuator The controller is also operable to determine when conditions arise which may cause damage to the sensor fingers if they remain in the deployed working position. In order to accomplish this, several finger raising criteria are stored on the controller and compared to the current operating condition of the header or the tractor so that if any one or more of the finger raising criteria are met, the controller will act to generate a lift signal that the actuator is responsive to for lowering the prescribed pressure of hydraulic fluid supplied to the actuator 62 sufficiently to raise the sensor fingers into the raised position thereof. More particularly, the prescribed pressure is lowered to a level which corresponds to a downward force or biasing torque acting on the sensor finger as a result of the actuator 62 which is exceeded by the upward force or biasing torque acting on the sensor finger as a result of the spring 67. In this manner, the spring force exceeds the force provided by the actuator 62 to automatically retract the actuator and raise the sensor finger into the raised position.

The various sensor raising criteria include a reverse travel criteria corresponding to displacement of the harvester frame in a reverse direction opposite to a normal forward direction for cutting crop. In order to accomplish this, the controller is operatively coupled to the operator drive selector 34 in the cab to determine the current drive condition and thus determine if the reverse travel criteria and has been met. Alternatively, the condition of various components in the drive system which determine the direction of the drive wheel rotation can be monitored to detect movement in the reverse direction M2.

The sensor raising criteria can also include a header position criterion such that a lift signal is generated by the controller to cause the actuators to respond and result in the sensor fingers being raised when the operator manually commands the header to be lifted out of the cutting position. The controller in this instance may be coupled to the header position controls or to a header position sensor to determine if the header is in the cutting position or is raised into a non-cutting position.

The sensor raising criteria can also include a header drive criterion such that a lift signal is generated by the controller to cause the actuators to respond and result in the sensor fingers being raised when the header drive is disengaged, regardless of drive direction.

If desired, the sensor raising criteria can also include a transport mode criteria corresponding to displacement of the driver seat into the transport mode facing rearwardly towards the engine 24, opposite to the forward working direction for cutting crop, regardless of the direction of movement of the swather tractor. By operatively coupling the controller to the drive selector or the operating position of the operator seat, the controller can determine if the transport criteria has been met. The transport mode is redundant and not required if a header drive criterion is present as the sensors will always be raised when the header drive is not engaged, and the header drive cannot be engaged when in the transport mode.

The sensor raising criteria can also include a turning criterion corresponding to a turning radius of the harvester frame exceeding a turning radius limit. In this instance the controller can be operatively coupled to the drive system, and more particularly the hydraulic motors 17 of the two drive wheels, so as to be arranged to measure the wheel speed of each wheel and calculate the relative wheel speed to estimate the turning radius of the harvester frame. If the turning radius exceeds a corresponding turning radius limit, the turning criteria is determined to have been met. Alternatively, the controller may be connected to a steering wheel sensor position or the like to determine the steering angle which is compared to the turning criterion by the controller to determine if the sensor fingers should be raised.

The sensor raising criteria can also include an override criterion corresponding to an override switch in the operator cab being in an active condition. The override switch could comprise a toggle switch operable between an inactive condition in which the controller operates automatically according to remaining criteria to determine if the sensor fingers should be raised or not, or an active condition in which the operator overrides the automatic control provided by the controller. In the active condition of the override switch, an override signal from the switch to the controller will cause the controller to generate the lift signal to raise the sensor fingers.

In addition to the criteria noted above, other criteria may be stored on the controller which represent other operating conditions or the header or the tractor where it is desirable for the sensor fingers to be raised. In either instance, if the controller determines that one or more of the criteria has been met, the controller will lower the prescribed pressure of hydraulic fluid supplied to the actuator 62 to cause the sensor fingers to be raised under the greater biasing torque provided by the springs 67. In either of the raised or working positions, the controller continues to monitor if any one of the criteria is met. Accordingly, when the corresponding criteria which may have triggered raising of the sensor fingers is no longer met, the controller will return the prescribed pressure supplied to the actuators 62 back to the normal operating pressure which corresponds to a biasing torque provided by the actuator 62 which exceeds the biasing torque of the spring to lower the sensor fingers back to the working position.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. crop harvesting machine comprising:
    a harvester frame having longitudinally opposed first and second ends supported for movement across ground having a crop thereon to be harvested;
    a drive system mounted on the harvester frame for propelling the harvester frame in one of a plurality of drive conditions across the ground;
    a cab mounted on the harvester frame for an operator;
    a header mounted at the first end of the harvester frame comprising a header frame with a main rear frame member and a plurality of forwardly extending frame members each supported by the main rear frame member, and an elongate cutter bar connected to the forward end of the forwardly extending frame members so as to be arranged along a front edge of the header frame for cutting the crop;
    a height control system for controlling a height of the header relative to the ground, the height control system comprising:
        a sensor assembly arranged to determine height of the cutter bar above the ground, the sensor assembly including (i) a sensor finger which is elongate between a top portion of the finger pivotally supported on the header and a bottom portion of the finger distal from the top portion such that the sensor finger is movable between a working position in which the finger depends from the top portion below the header frame to the bottom portion of the finger which is spaced below the header frame for engaging the ground and following contours of the ground and a raised position in which said bottom portion of the sensor finger is in close proximity to a bottom of the header frame and (ii) a position sensor arranged to generate an output signal corresponding to the height of the header relative to the ground based upon a position of the sensor finger;

a lift linkage operable between the header frame and the harvester frame to raise and lower the header frame relative to the harvester frame responsive to the output signal of the position sensor to position the cutter bar at a prescribed height;

a controller arranged to generate a lift signal; and a sensor positioning assembly including an actuator operatively connected between the header frame and the sensor finger below the header frame and being operatively coupled to the controller so as to be arranged to lift the sensor finger from the working position to the raised position responsive to the lift signal from the controller.

2. The crop harvesting machine according to claim 1 wherein the sensor positioning assembly includes a biasing member to bias the sensor finger towards one of the raised position and the working position and wherein the actuator of the sensor positioning assembly is operable to produce a biasing force acting against the biasing member to position the sensor finger in the other one of the raised position and the working position, the actuator being responsive to the lift signal from the controller to displace the sensor finger from the working position to the raised position.

3. The crop harvesting machine according claim 2 wherein the biasing member acts to urge the sensor finger towards the raised position and the actuator acts to urge the sensor finger towards the working position.

4. The crop harvesting machine according to claim 1 wherein the actuator of the sensor positioning assembly is operable in the working position to control a downward pressure of the sensor finger on the ground according to a set point pressure within a range of downward pressures, the set point pressure being controllably adjustable by the controller.

5. The crop harvesting machine according to claim 4 wherein the set point pressure is automatically controlled by the controller responsive to a height of the header frame.

6. The crop harvesting machine according to claim 2 wherein the actuator of the sensor positioning assembly is a hydraulic actuator and the a downward pressure of the sensor finger on the ground is controllably adjusted by using the controller to control a hydraulic pressure supplied to the actuator from a hydraulic supply on the harvester frame.

7. The crop harvesting machine according to claim 6 wherein the hydraulic supply is operable to vary the hydraulic pressure supplied to the actuator throughout of range of pressures in the working position to maintain engagement of the sensor finger with the ground through a range of heights of the header frame relative to the ground.

8. The crop harvesting machine according to claim 6 wherein the controller is arranged to reduce the hydraulic pressure supplied by the hydraulic supply to the actuator to a reduced pressure corresponding to a force applied to the sensor finger by the actuator being exceeded by a force applied to the sensor finger by the spring for raising the sensor finger to the raised position.

9. The crop harvesting machine according to claim 1 wherein the controller includes a sensor lifting criterion stored thereon and wherein the controller is arranged to generate the lift signal when a prescribed operating condition of the crop harvesting machine meets the sensor lifting criterion.

10. The crop harvesting machine according to claim 9 wherein the sensor lifting criterion includes a non-cutting position of the header such that the controller is arranged to generate the lift signal when the header is lifted out of a cutting position of the header.

11. The crop harvesting machine according to claim 9 wherein the sensor lifting criterion includes a reverse travel criterion such that the controller is arranged to generate the lift signal when the harvester frame is operated in a reverse direction opposite to a normal forward direction for cutting crop.

12. The crop harvesting machine according to claim 11 wherein the controller is operatively coupled to an operative drive selector in the operator cab to determine the operating condition and if the reverse travel criterion has been met.

13. The crop harvesting machine according to claim 9 wherein the sensor lifting criterion includes a turning criterion corresponding to a turning radius of the harvester frame exceeding a turning radius limit.

14. The crop harvesting machine according to claim 13 wherein the controller is operatively coupled to the drive system so as to be arranged to measure relative wheel speed between laterally opposed drive wheels on the harvester frame to determine the turning radius of the harvester frame if the turning criterion has been met.

15. The crop harvesting machine according to claim 1 wherein the sensor finger is contained within a lower boundary of the header frame in the raised position.

16. The crop harvesting machine according to claim 15 wherein the bottom portion of the sensor finger is supported at or above a bottom side of the beams in the raised position.

17. The crop harvesting machine according to claim 1 wherein the sensor finger is pivotal between the working position and the raised position about a finger pivot axis and wherein the crop harvesting machine further comprises a resilient bushing pivotally supporting the sensor finger relative to the header frame such that the sensor finger can be angularly deflected relative to the finger pivot axis.

18. The crop harvesting machine according to claim 1 further comprising a plurality of sensor assemblies at spaced apart positions across the header frame and a sensor positioning assembly associated with each sensor assembly which is responsive to said controller.

19. The crop harvesting machine according to claim 9 further comprising an operator input supported within the cab so as to be arranged to be activated by an operator within the cab and wherein the sensor lifting criterion includes an activated condition of the operator input such that the controller is arranged to generate the lift signal when the operator input is in the activated condition.

20. The crop harvesting machine according to claim 1 wherein the sensor finger is retained in the raised position by maintaining the actuator in a prescribed operating condition.

* * * * *